(12) United States Patent
Wexler et al.

(10) Patent No.: US 8,319,796 B2
(45) Date of Patent: Nov. 27, 2012

(54) GENERATING A TEXTURE FROM MULTIPLE IMAGES

(75) Inventors: Yonatan Wexler, Redmond, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/367,302

(22) Filed: Feb. 6, 2012

(65) Prior Publication Data

US 2012/0133665 A1 May 31, 2012

Related U.S. Application Data

(62) Division of application No. 11/903,070, filed on Sep. 20, 2007, now Pat. No. 8,125,493.

(51) Int. Cl.
*G09G 5/00* (2006.01)
(52) U.S. Cl. ......... 345/629; 345/634; 345/440; 382/294
(58) Field of Classification Search .................. None
See application file for complete search history.

(56) References Cited

U.S. PATENT DOCUMENTS

| | | | |
|---|---|---|---|
| 6,005,582 A | 12/1999 | Gabriel et al. | |
| 6,009,190 A | 12/1999 | Szeliski et al. | |
| 6,538,654 B1 | 3/2003 | Rose et al. | |
| 6,825,838 B2 | 11/2004 | Smith et al. | |
| 6,850,274 B1 | 2/2005 | Silverbrook et al. | |
| 6,970,174 B2 | 11/2005 | Fujiwara et al. | |
| 7,158,143 B2 | 1/2007 | Prokopenko et al. | |
| 7,205,998 B2 | 4/2007 | Wang et al. | |
| 7,561,757 B2 * | 7/2009 | Sabuncu et al. | 382/294 |
| 7,576,738 B2 | 8/2009 | Litke et al. | |
| 7,616,807 B2 | 11/2009 | Zhang et al. | |
| 7,653,264 B2 * | 1/2010 | Hero et al. | 382/294 |
| 7,995,810 B2 | 8/2011 | Li et al. | |
| 8,009,897 B2 | 8/2011 | Xu et al. | |
| 2006/0244757 A1 | 11/2006 | Fang et al. | |

OTHER PUBLICATIONS

Kwatra, et al., Texture Optimization for Example-based Synthesis, Date: 2005, pp. 795-802, ACM Press, New York, USA.
Sloan, et al., "Importance Driven Texture Coordinate Optimization", Eurographics, Date: 1998, vol. 17, Issue: 3, Blackwell publishers, MA, USA.
"Graphcut Textures: Image and Video Synthesis Using Graph Cuts," Kwatra et al. SIGGRAPH 2003 accessed via the web @ http://www.cc.gatech.edu/cpl/projects/graphcuttextures/.

* cited by examiner

*Primary Examiner* — Antonio A Caschera

(57) ABSTRACT

A texture is generated using a plurality of images and a geometry that correspond to an object. The geometry is mapped to each of the plurality of images. A graph includes a plurality of nodes corresponding to portions of the images. An edge exists between a first node and a second node if a first portion corresponding to the first node and a second portion corresponding to the second node can be neighboring portions in a resulting image. Ways of forming the resulting image are represented by paths in the graph. Edges and nodes in the graph may have associated costs. A path in the graph having a smallest total cost is determined and represents the resulting image. A texture is generated for the object using the resulting image.

20 Claims, 11 Drawing Sheets

GENERATING A TEXTURE FROM MULTIPLE IMAGES

This is a divisional application of application Ser. No. 11/903,070, filed on Sep. 20, 2007 now U.S. Pat. No. 8,125,493.

BACKGROUND

Texture mapping is a technique used for adding detail, surface texture or color to increase the realism of rendered objects, such as 2-dimensional or 3-dimensional objects. In connection with texture mapping, a texture, such as a bitmap, is mapped to the surface of a shape or a geometry representing an object to be texturized. One source of textures is an image of a real object. However, an accurate geometry of an object to be texturized may not be known such as with 3-dimensional objects.

In connection with some objects, such as a building, the entire object may not be captured in a single image. Thus, as part of generating a texture for the building, one existing technique combines multiple images of the building generating a single, resulting one texture image. As mentioned above, an accurate geometry of the building may not be known and an approximate geometry for the building may be used. Moreover, some images may contain unwanted objects that occlude another object, such as the building, for which a texture is generated. Each of the multiple images is mapped to the approximate geometry. Any deviation of the building in the image from the approximate geometry generates a visual artifact or distortion which may appear in the final combined image used to texture the building. A problem exists as to how to combine the multiple images using the approximate geometry to generate a texture while seeking to reduce or eliminate the visual artifacts and distortions that may be introduced. In forming a combined resulting image, a first portion may be included from a first of the multiple images and a second portion from a second of the multiple images. In the resulting image, the first portion may be aligned, such as along a vertical seam, with the second portion. One technique for deciding whether to combine and align the first and second portions in the resulting image considers whether there is color continuity between the first and second portions. In other words, the technique strives for color continuity at the seam or transition point between the foregoing aligned first and second portions included in the resulting image.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described for combining multiple images and generating a resulting image. A graph may include nodes corresponding to portions of the multiple images. Transitions or edges between nodes indicate that portions represented by the nodes may be placed next to each other in the resulting image. Costs may be associated with edges and/or nodes in the graph. Each path in the graph represents a possible ordering of portions of the multiple images in the resulting image. A texture may be generated for an object included in the resulting image.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
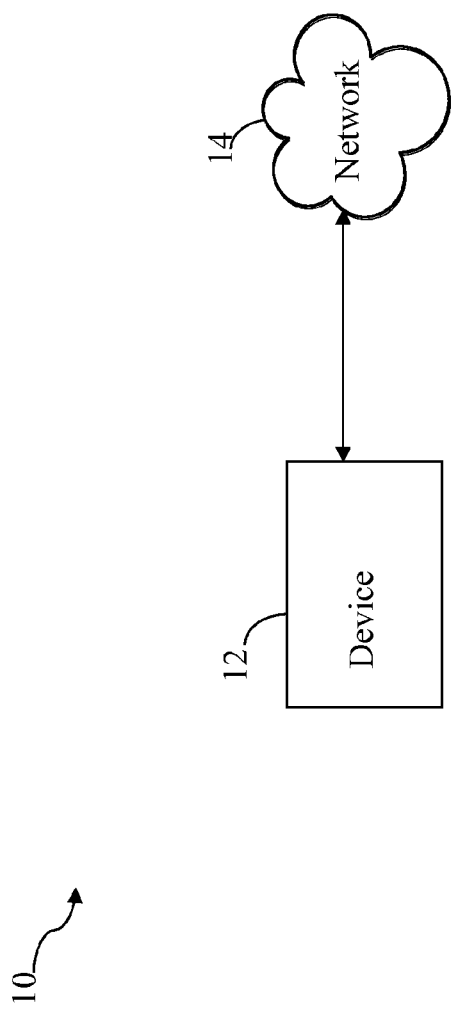
FIG. 1 is an example of an embodiment illustrating an environment that may be utilized in connection with the techniques described herein.

Referring to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with combining multiple images and generating a texture therefrom. As known in the art, texture mapping is a technique used for adding detail, surface texture or color to increase the realism of rendered objects, such as 2-dimensional or 3-dimensional objects. In connection with texture mapping, a texture, such as a bitmap, is mapped to the surface of a shape or a geometry representing an object to be texturized. One source of textures is an image of a real object. However, an accurate geometry of an object to be texturized may not be known such as with 3-dimensional or other complex objects. Rather, an approximate geometry may be known and used with the techniques herein for generating a texture from a resulting image. The resulting image may be formed by combining multiple images including the object. In accordance with another aspect, techniques are described herein for combining images, such as of a same scene or object taken from multiple views, and generating a resulting image in which visual artifacts and distortions are minimized. A resulting portion of the resulting image may be formed by combining two other portions, each from a different one of the images being combined. When determining whether to combine the two other portions and include them in the resulting image, the technique considers whether the combination appears similar to content included in at least one of the multiple input images being combined. The resulting image may be used in connection with generating a texture for an object included in the resulting image.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Included in example 10 of FIG. 1 are a device 12 and a network 14. The device 12 may be, for example, a computer, such as a personal computer, having a display output device and an input device providing for interactive I/O with a user thereof. In following paragraphs, additional details are provided with respect to the device 12. However, the same details may also apply to one or more other devices that may be connected to the network 14 in an embodiment. Although the example 10 of FIG. 1 includes only a single device, an embodiment utilizing the techniques herein may include any number of devices and other components.

The device 12 included in FIG. 1 is exemplary for purposes of illustrating the techniques described herein in connection with software components. In one embodiment, any device 12 providing the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with other computers or components not shown in FIG. 1. As described herein, the device 12 may be a personal computer. In other embodiments, the functionality of device 12, or the device 12 itself, may be included in another component in accordance with a particular environment in which the device 12 is utilized.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s) to the network and/or other components.

It should be noted that although the device 12 is illustrated as having network connectivity, the techniques described herein may be used in connection with a device operating standalone without such connectivity.

Figure 2:
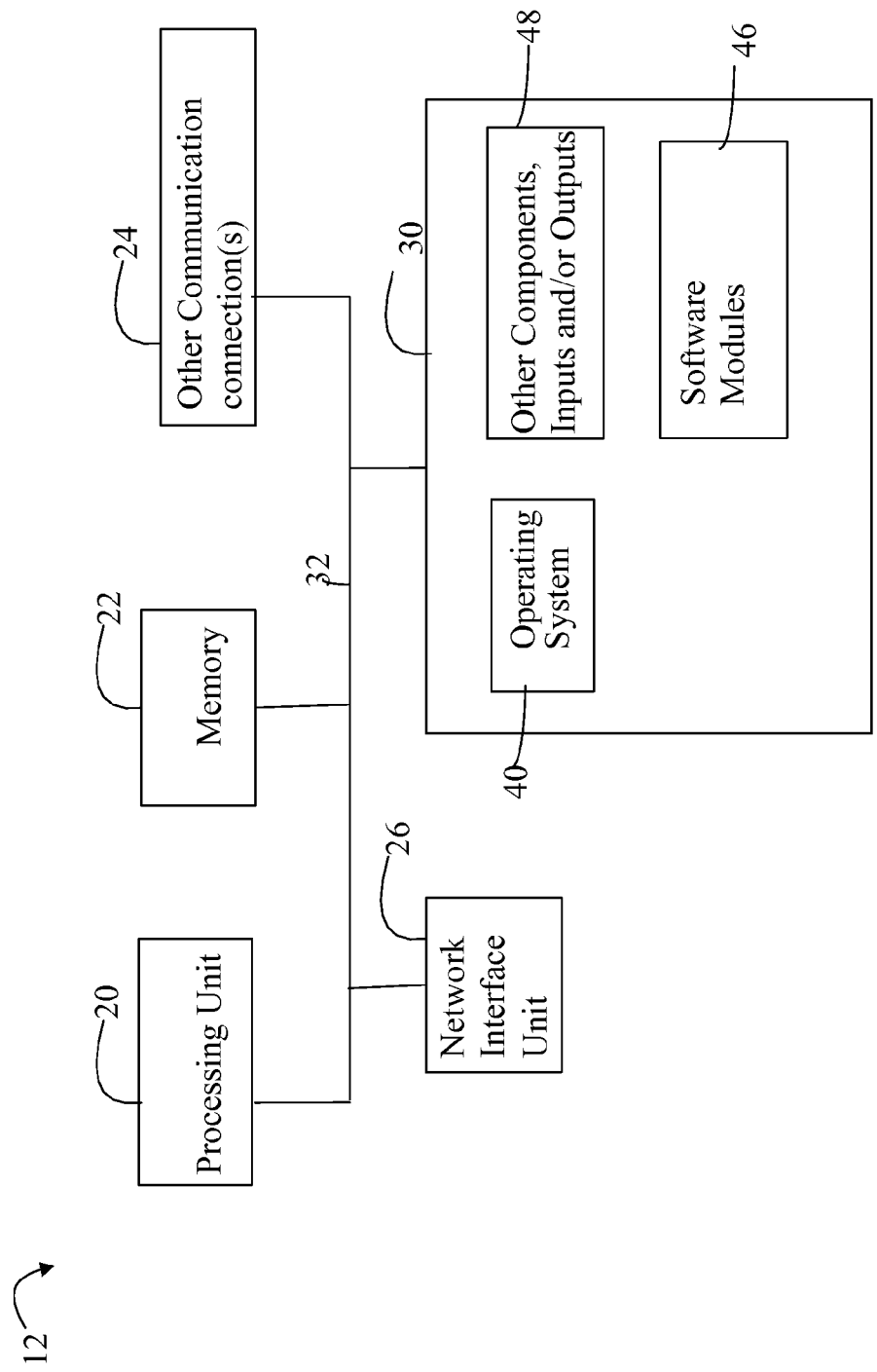
FIG. 2 is an example of an embodiment of components that may comprise a device of FIG. 1.

Referring to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media may be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12.

The device 12 may also contain communications connection(s) 24 that allow the computer to communicate with other devices and components such as, by way of example, input devices and output devices.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, programming modules 46, and other components, inputs, and/or outputs 48.

The operating system 40 may be any one of a variety of commercially available or proprietary operating systems. The operating system 40, for example, may be loaded into memory in connection with controlling operation of the device 12.

The modules 46 may include one or more executable code modules used in connection with performing the techniques as described herein for combining multiple images using an approximate geometry and generating a texture therefrom while also minimizing the visual artifacts and distortions introduced into the resulting combined image. As will also be described and appreciated by those skilled in the art, the techniques herein have broad applicability and may also be used in connection with other applications besides generating a texture. The techniques herein generate a resulting image based on similarity to content included in one or more of the images being combined. The resulting image may be generating using a geometry and mapping each image being combined to the geometry. The geometry may approximate or estimate the shape of the actual geometry of an object for which a texture is generated. The approximate geometry may be used with the techniques herein as opposed to requiring a more complex and accurate geometry for the object. The foregoing techniques are described in more detail in following paragraphs.

Figure 3:
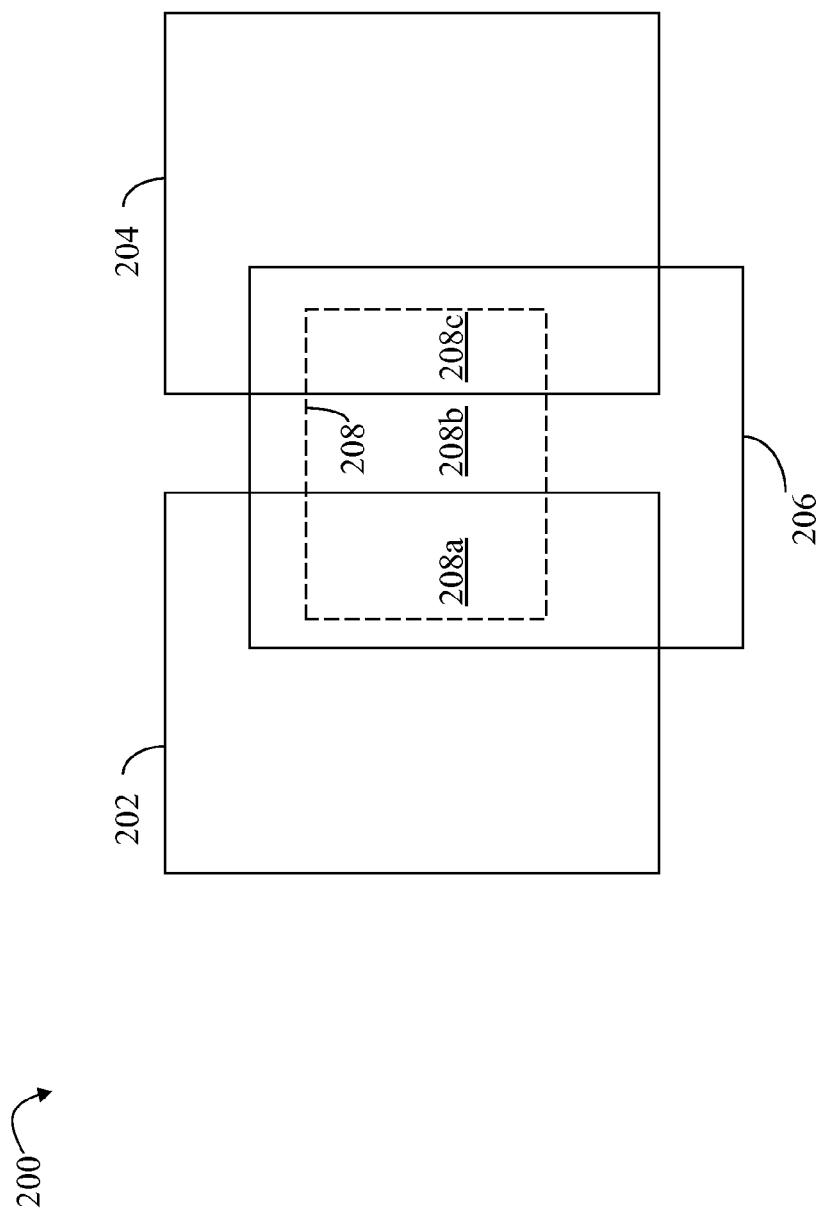
FIG. 3 is an example illustration of mapping images to a selected geometry of an object for which a texture is being generated.

Referring to FIG. 3, shown is an illustration of multiple images that may be used in connection with the techniques herein. Three images are included in the example 200 for purposes of simplicity of illustration and should not be construed as a limitation. The three images 202, 204 and 206 may be used to generate a resulting image formed by combining portions of the three input images 202, 204 and 206. Element 208 may represent a geometry corresponding to an object appearing in whole or in part in each of the three input images. Each of the input images 202, 204 and 206 are mapped to the selected geometry to be included in the resulting image. Although FIG. 3 illustrates a mapping based on translation, the mapping may be any one of a variety of different types such as, for example, rotation, scale, affine, and homographic. The geometry may correspond to an object for which a texture is being generated as a result of combining the three input images. As an example, each of the input images may represent a different view of the object, such as a building. It may not be possible to capture the entire building in a single image so multiple images each taken from different viewpoints may be combined to generate a texture for the building. In connection with the techniques herein, the geometry 208 may approximate the geometry of the object being texturized. The actual geometry of the building may be characterized as more complex than the approximate geometry. For example, if the object is a building, the selected approximate geometry may be a cube approximating the general shape of the building and its surfaces. The techniques described herein may be used in connection with the approximate geometry rather than requiring specification of a more complex geometry closer to the actual shape of the building.

The example 200 illustrates how each of the images may be approximately aligned and mapped to the geometry 208 of a corresponding object appearing, in whole or in part, in the input images. As seen, portions of the three input images overlap one another and may be used in forming the resulting image and texture for the object. The texture for object may include portions 208a, 208b and 208c. Portion 208a may be formed using image 202 and/or image 206. Portion 208b may be formed using image 206. Portion 208c may be formed using image 204 and/or 206. The techniques herein may be used in selecting which portions of 202 and/or 206 are used in forming 208a, and which portions of 204 and 206 are used in forming 208c.

The resulting image used to generate the texture for 208 may be characterized as a combination of image patches from the different, combined input images 202, 204 and 206. Described in following paragraphs are techniques used to decide what patches to include from each of the input images in the areas of overlap between the input images. The techniques may be used to determine when to transition from one input image to the next in the areas of overlap. For example, area 208a of the resulting texture may be generated using a first portion of 202 and/or a second portion of 206. There may be various points at which a transition from the first portion to the second portion is possible in connection with the area of overlap between 202 and 206. The various possible transition points may be evaluated. For each possible transition point, a neighborhood or window of pixels may be examined and a similarity measurement determined. The similarity measurement may express a degree of similarity, for example, between the window of pixels and the input images. The window of pixels, or portion thereof, may be compared to other pixels in the three input images to determine if the window of pixels appears in any of the input images. In other words, if the window of pixels, or portion thereof, appears exactly in one of the input images, the similarity measurement of the associated transition point indicates the exact match. Otherwise, the similarity measurement indicates how similar the window of pixels, or portion thereof, is with respect to the input images. As described in more detail in following paragraphs, the techniques herein penalize a point of transition between images causing content to appear in the resulting image which does not appear similar to content in one of the input images. As such, the techniques herein may be used to generate a plausible or realistic texture for an object by discouraging selection of transitions resulting in content not appearing similar to content of input images being combined.

What will now be considered is an example in which the alignment of the various input images in the areas of overlap is known. For example, it is known which columns of pixels of image 202 overlap and align with image 206, and which columns of pixels of image 206 overlap and align with image 204.

Figure 4:
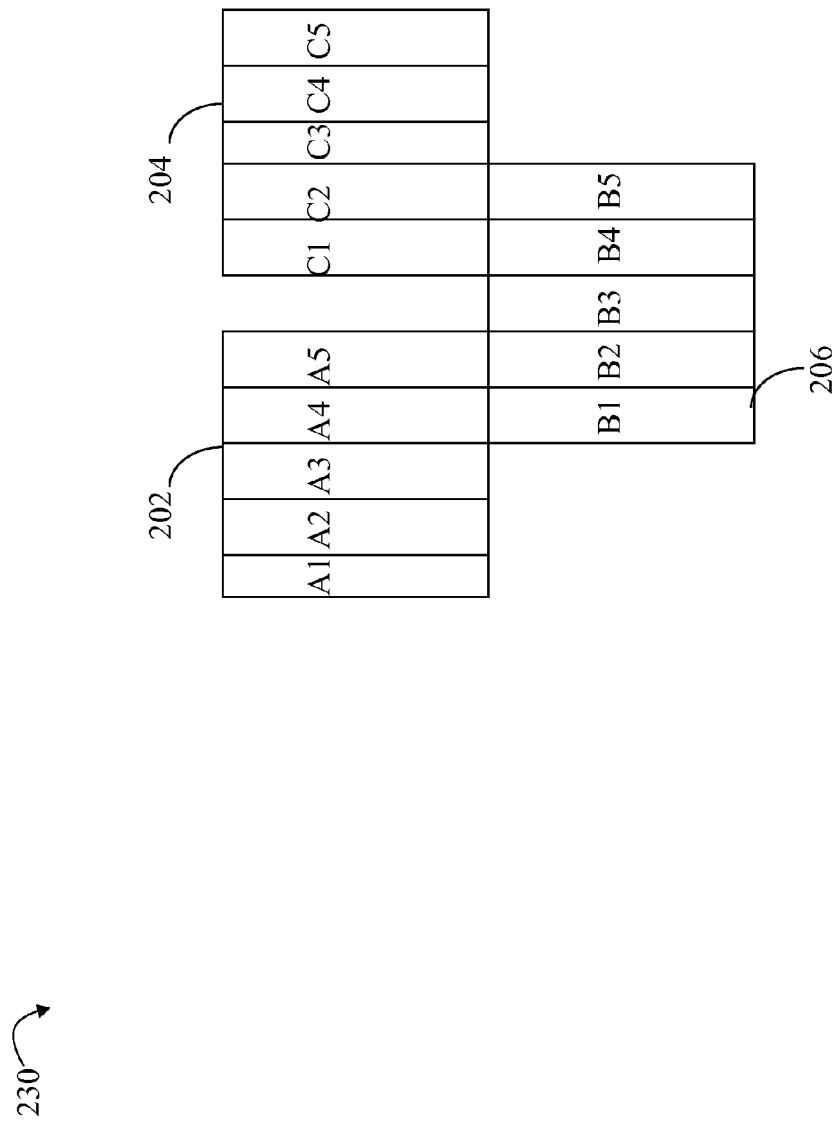
FIG. 4 is an example illustrating overlapping image portions.

Referring to FIG. 4, shown is an example 230 illustrating how columns of pixels of each of the three input images from FIG. 3 align with one another. For simplicity of illustration, each image 202, 204 and 206 is shown as including 5 columns of pixels. Image 202 includes pixel columns A1, A2, A3, A4 and A5. Image 206 includes pixel columns B1, B2, B3, B4 and B5. Image 204 includes pixel columns C1, C2, C3, C4 and C5. A4 and A5 of image 202 align or overlap, respectively, with B1 and B2 of image 206. B4 and B5 of image 206 align or overlap, respectively, with C1 and C2 of image 204.

At each point of overlap between two of the images when forming the resulting image, a decision is made as to whether to use a next column of pixels from the current image or otherwise transition to another image (i.e., use a next column of pixels from the other image). With reference to the example 230, each of the different possibilities of pixel columns included in the resulting image may be represented by a path of pixel columns. The path may specify an ordering or placement of the different portions from the different input images. For example, the resulting image may include A1, A2 and A3. At this point, the resulting image may include A4 or B1. In a first instance, consider A4 as the fourth element in the path. If A4 is selected, A5 or B2 may be selected as the fifth element in the path. B3 may be selected as the sixth element in the path in the case either A5 or B2 is selected as the fifth element. In a second instance, consider if B1 is selected rather than A4 as the fourth element in the path. Either A5 or B2 may be selected as the fifth element in the path. B3 may be selected as the sixth element in the path in the case either A5 or B2 is selected as the fifth element. Thus, the possible paths of length 6 (e.g., having 6 columns) may be enumerated as follows:

```
A1 A2 A3 A4 A5 B3
A1 A2 A3 A4 B2 B3
A1 A2 A3 B1 B2 B3
A1 A2 A3 B1 A5 B3
```

From B3, different possibilities may be similarly enumerated for columns 7-11 of paths as follows:

B4 C2 C3 C4 C5
B4 B5 C3 C4 C5
C1 B5 C3 C4 C5
C1 C2 C3 C4 C5

The foregoing possibilities for columns 7-11 may occur in combination with each of the possible enumerated paths of length 6 described above.

A graph may be used to represent the foregoing possible paths and transitions corresponding to different combinations of image patches that may be included in the resulting combined image. In the foregoing, each image patch is a one pixel wide column or vertical slice of pixels. In another embodiment, an image patch may also be a vertical slice of a different width. In yet another embodiment, an image patch may correspond to a row (e.g., horizontal slice) of one or more pixels. As described below, all possible paths from A1 to C5 represent the different possible combinations of consecutive pixel columns that may be used in constructing the resulting image combining the 3 input images.

Figure 5:
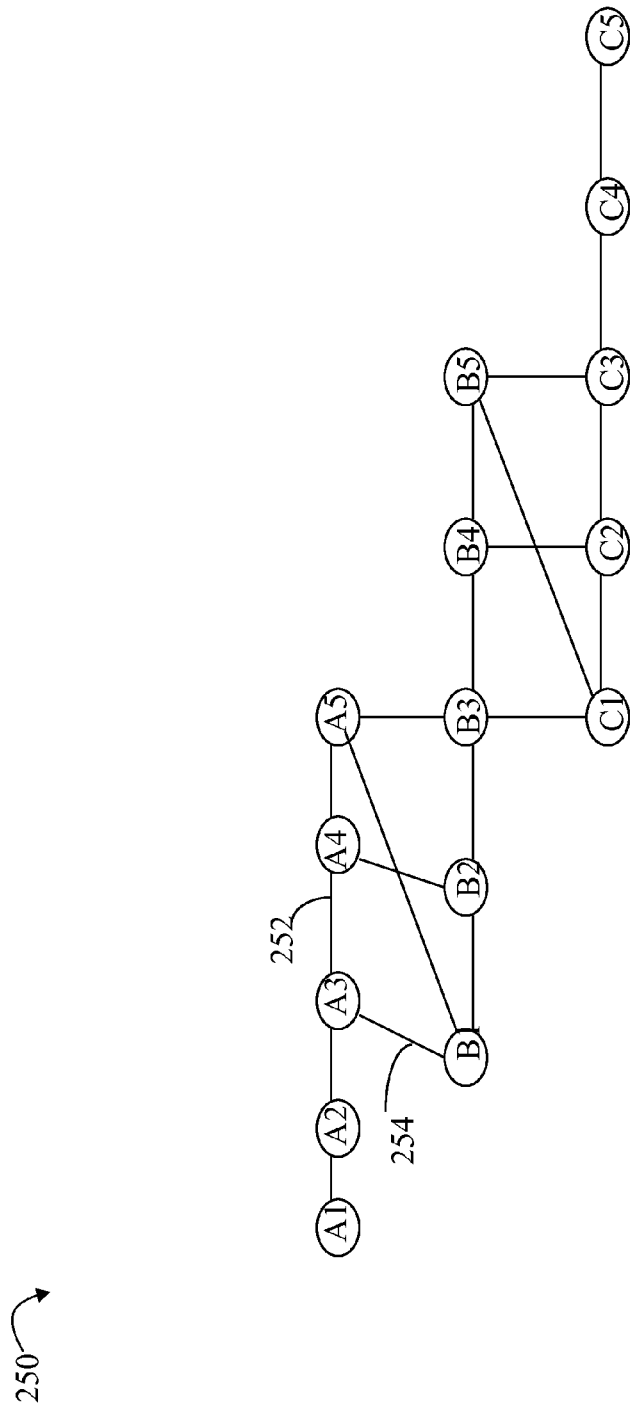
FIG. 5 is an exemplary graphical representation of possible paths used to form a resulting image from the input images of FIG. 4.

Referring to FIG. 5, shown is a graphical representation of the possible columns of pixels forming the resulting image. The graph in the example includes a node representing each column of pixels. An edge connects two nodes if the two columns of pixels represented may be neighboring pixels columns so that there may be a transition from a first of the two columns to a second of the two columns. Two pixel columns may be neighbors if they may be placed successively next to each other in the resulting image. Each node in this example is labeled in accordance with the pixel column designation as set forth in FIG. 4. At the points of overlap between two images, different multiple transitions are possible. For example as indicated in FIG. 4, A4 and A5 of image 202 overlap, respectively, B1 and B2 of image 206. From A3, transition 252 to A4 is possible as well as transition or edge 254 to B1. Similarly, the example 250 includes other transitions representing columns of pixels that may be neighbors in accordance with the various possible transition points between images in areas of overlap.

In connection with techniques herein, a cost proportional to a similarity measurement may be associated with each edge connecting two nodes in the graph. The similarity measurement may be characterized as a score indicating a degree to which the two pixel columns represented by the two nodes appear as a successive pair in one of the input images. For example, a cost is associated with edge 254 representing the degree of similarity of pixel columns A3 B1 indicating how similar the successive combination of A3 and B1 is with respect to the input images 202, 204 and 206. A similarity measurement may be determined by comparing the combination of A3 B1 to other pairs of consecutively occurring pixels columns of the three input images. For example, the sub-image or image portion formed by A3 B1 may be compared to each of the following pixel column pairs: A1 A2, A2 A3, A3 A4, A4 A5, B1 B2, B2 B3, B3 B4, B4 B5, C1 C2, C2 C3, C3 C4, C4 C5. The cost of 254 may be proportional to the best similarity measurement of all the foregoing comparisons. An embodiment may determine the cost as the actual similarity measurement or a normalized similarity measurement. For example, similarity measurements may be normalized to values within a predetermined range of values. In one embodiment, an edge having a cost or similarity measurement of zero (0) may indicate that the pixel columns represented by the connected nodes are an exact match to a pair of consecutive columns in one of the input images. The larger the similarity measurement, the greater the difference with respect to the input images. As such, the selected similarity measurement may be represented as the minimum of the similarity measurements computed for all comparisons. More generally, the similarity measurement of an edge E between nodes N1 and N2 may be expressed as the minimum similarity measurement determined for all comparisons of N1 N2 to consecutive columns of pixels in each of the input images.

An embodiment may use any one of a variety of different functions to measure the similarity of N1 N2 with respect to consecutive pairs of columns in the original images. For example, one embodiment may use the sum of squared differences (SSD). The SSD may be represented as:

$$\sqrt{\sum_{i=1}^{n}(Ui\ Vi)^2}$$

for two images or subimages, U and V, where the $i^{th}$ pixel in U is denoted as $U_i$ and the $i^{th}$ pixel in J is denoted as $V_i$, for all the pixels, n, in the images U and V being compared. For purposes of example with reference to the edge 254, U may be the sub-image or image portion formed by A3 B1. A value for the SSD may be computed when comparing U to each possible value for V which, in this example, is each of the following pixel column pairs: A1 A2, A2 A3, A3 A4, A4 A5, B1 B2, B2 B3, B3 B4, B4 B5, C1 C2, C2 C3, C3 C4, C4 C5. The cost of the edge 254 may be determined as the minimum SSD value for all the comparisons based on pixel intensity. In connection with the techniques herein, the smaller the cost value, the greater the degree of similarity between the image portions compared. The larger the cost value, the greater the degree of difference or dissimilarity between the two image portions compared.

As illustrated above, the image portion U formed from a first portion of one of the input images and a second portion of another one of the images may be compared to every pair of consecutive pixel columns of all input images. An embodiment may also utilize different techniques to limit or reduce the number of comparisons as well as the size of the sub images compared. For example, it may be known that particular input images or certain areas of one or more of the input images more accurately represent the object (e.g., due to higher resolution, varying levels of lighting, varying quality of camera producing the image, various environmental factors, and the like). Such information may be used to perform selective comparisons. For example, if it is known that one of the input images was obtained under conditions adversely affecting the image quality for portions of an image, (e.g., bad lighting in one area of the image), comparisons may be omitted for those portions (e.g., particular columns) of the input image.

As another example, rather than perform a comparison between every pixel in U (e.g., the two columns from the foregoing first and second portions from the two different images) and every corresponding pixel in each V (e.g., two consecutive columns in one of the input images), a subset of the pixels in U may be compared to a subset of the pixels in V. The subset may be selected using some heuristic. For example, every other pixel in U may be compared to every other pixel in V such as pixels which are only in the even-numbered rows or only the odd-numbered rows. The foregoing are some examples of selectively limiting the number of comparisons made in determining the costs associated with the edges associated with overlapping areas between two or more images.

It will be appreciated by those skilled in the art having the benefit of this disclosure that other functions may be used in connection with the techniques herein for computing costs of edges. For example, other functions which measure the similarity between two images or image portions include sum of absolute differences, cross correlation, normalized cross correlation, and the like. Any such function measuring a degree of similarity between two images or image portions may be used in determining the cost of an edge.

It will also be appreciated by those skilled in the art having the benefit of this disclosure that the techniques herein may be used in connection with images of varying dimensions, such as 2 or 3 dimensions, as well as images which are color, black and white, grayscale, and the like. The similarity measurement and function may utilize pixel intensity, such as for black and white and grayscale images, as well as the R G B color components in connection with a color image. It should also be noted that although overlap areas in examples herein included two overlapping images, an overlap area may occur between more than two images being combined using the techniques herein.

In connection with FIGS. 4 and 5, described above are exemplary uses of the techniques herein when alignment of the input images in connection with the areas of overlap is known. For example, in FIGS. 4 and 5, the two overlapping images may be exactly aligned on a pixel boundary so that the point at which a first column of pixels in one image corresponds to a second column of pixels in another image overlapping image is known. It may also be the case that such alignment is not exactly known. Rather, alignment between the images with respect to the overlap between the images may be known with a particular alignment range. With respect to the example of FIGS. 4 and 5, the alignment range is 0 in that the alignment is exactly known. An alignment range, such as +/− some value, may be used to express the degree of uncertainty in alignment or possible misalignment of overlapping image areas. It should be noted that the alignment range may also be expressed using an initial alignment value+range, or an initial alignment value−range. An example illustrating the foregoing is set forth in following paragraphs.

It should be noted that the graph as represent in the example FIG. 5 may be an undirected graph. A directed graph (digraph) may also be used to represent the possible transitions as illustrated in following examples.

Figure 6:
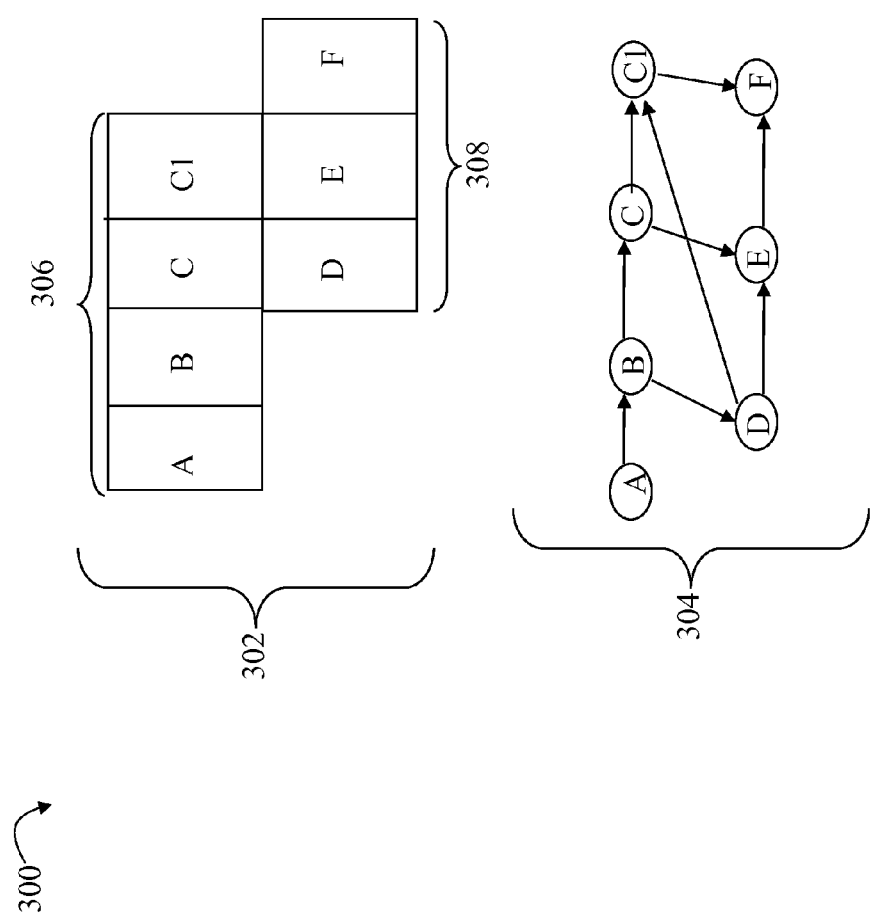
FIGS. 6, 7, and 8 illustrate additional examples for forming a resulting image using an alignment range.

Referring to FIG. 6, shown is an example 300 illustrating two overlapping images and an associated graph representing the possible paths for forming the resulting image. Element 302 includes a first input image 306 having pixel columns A B C C1 and a second input image 308 having pixel columns D E F. Images 306 and 308 have an area of overlap at which C and C1 of image 306 overlap, respectively, D and E of image 308. Element 302 may be the estimate as to the pixel column alignment of images 306 and 308. Element 304 represents the graph of possible transitions between pixel columns in the two images from 302 when forming the resulting image by combining 306 and 308. Element 304 represents a case similar to that as described in connection with FIG. 5 when the alignment or points of overlap are known.

Figure 7:
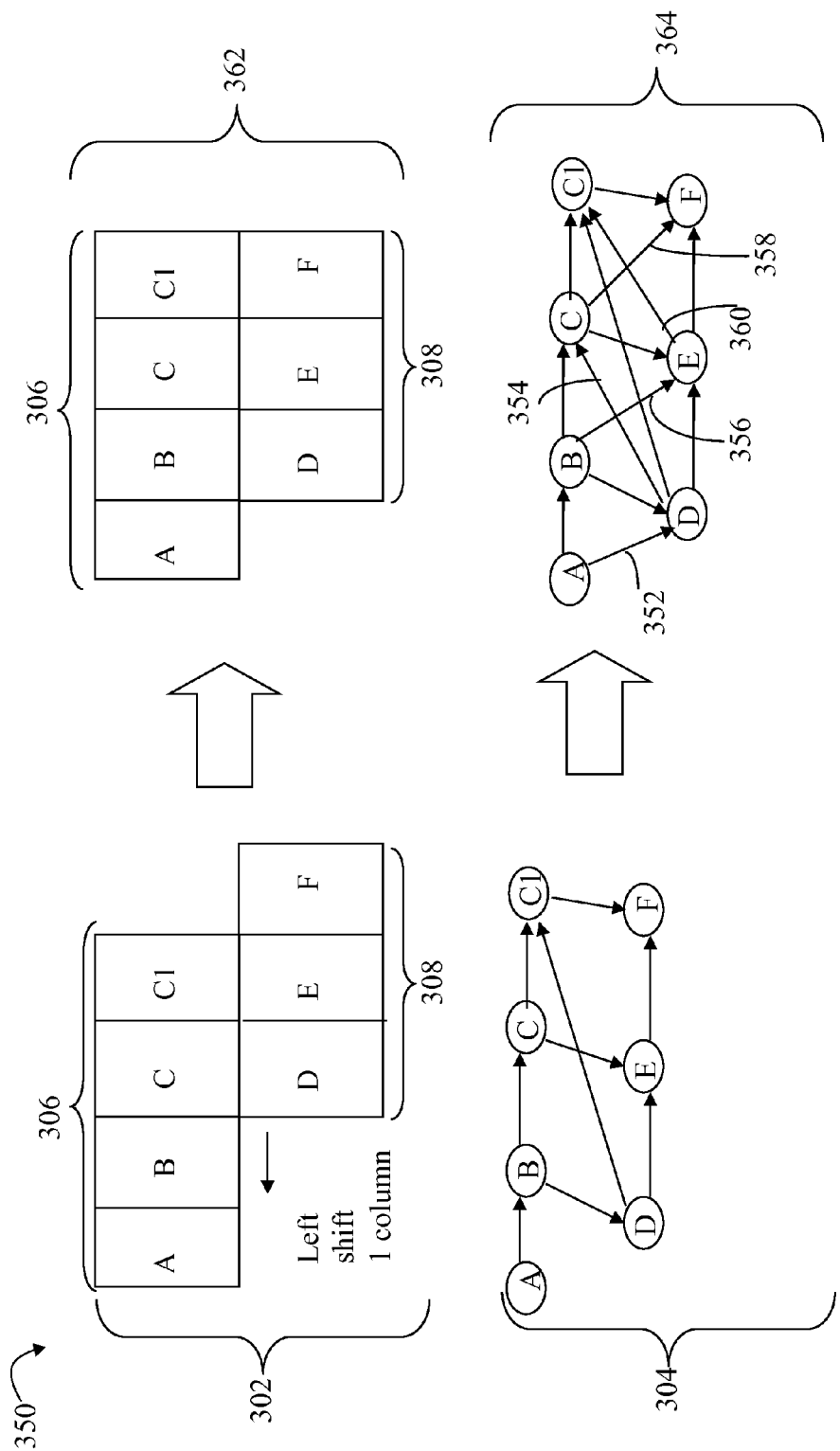
Figure 8:
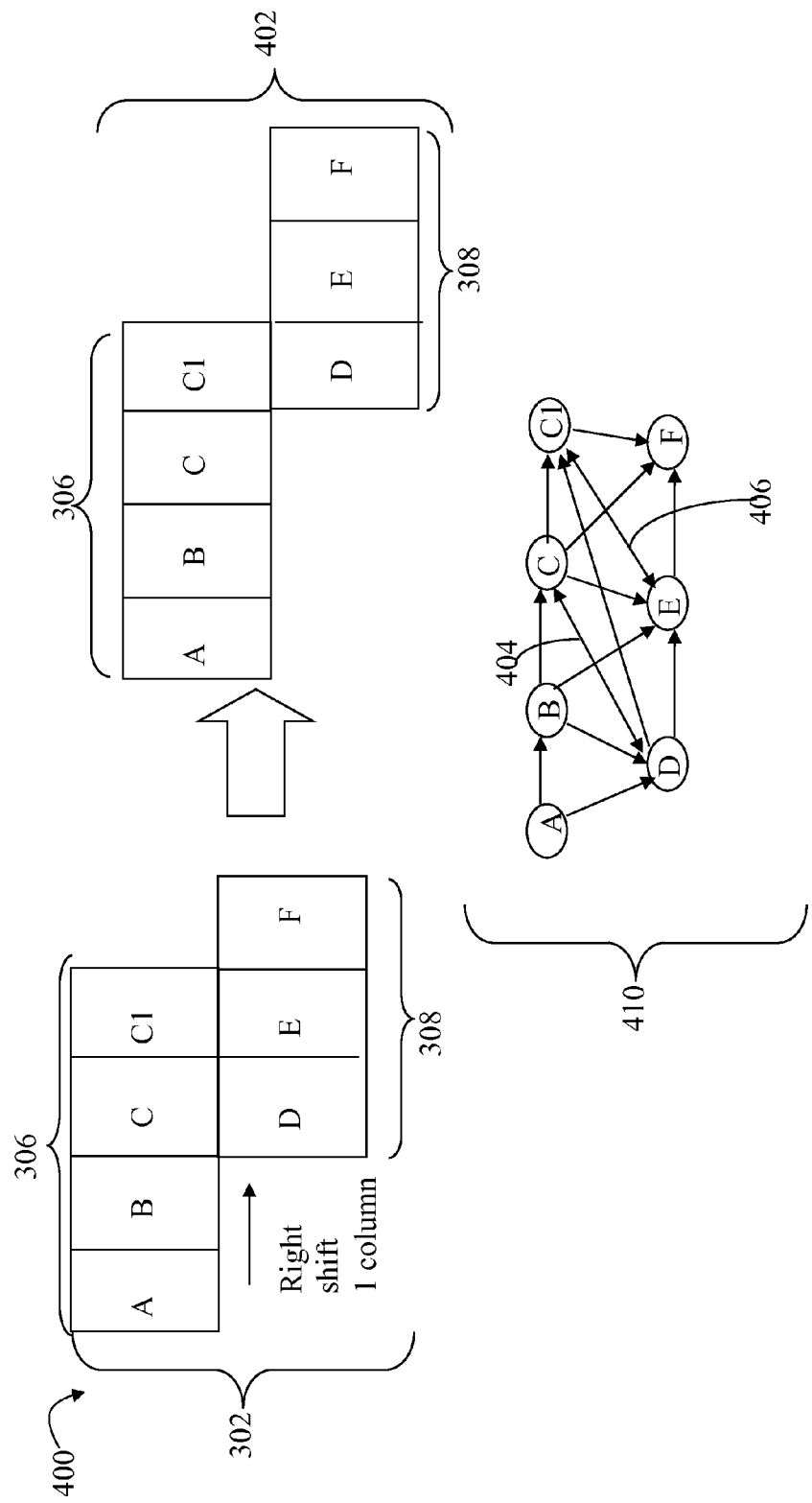

To account for possible misalignment, an alignment range of +/−1 may be utilized in connection with the techniques herein. In such a case, additional transitions between the two images are possible. The graph of 304 may be extended to include additional transitions reflecting the alignment range as will now be illustrated. FIG. 7 illustrates the additional transitions in the graph for the alignment range "−1" and FIG. 8 illustrates the additional transitions in the graph for the alignment range "+1". It should be noted that an alignment range of +/−1 is selected for purposes of illustration and different values may be selected for the alignment range.

Referring to FIG. 7, shown is an example 350 illustrating the transitions added to the graph to address the alignment range of −1. In this example, "−1" indicates a shift left of one pixel column of the image 308 with respect to the image 306. Element 362 illustrates the situation considered with a possible misalignment by "−1" pixel columns in which B and C of the first image overlap, respectively, D and E of the second image. In other words, rather than align or overlap as indicated in 302, it may be that the alignment is actually as illustrated in 362. Graph 304 has been modified to include additional edges 352 (A D), 354 (D C), 356 (B E), 358 (C F) and 360 (E C1) representing the additional possible transitions between images 306 and 308.

Referring to FIG. 8, shown is an example 400 illustrating the transitions added to the graph to address the alignment range of +1. In this example, "+1" indicates a shift right of one pixel column of the image 308 with respect to the image 306. Element 402 illustrates the situation considered with a possible misalignment by "+1" pixel columns. Graph 410 is a further modification to the graph 364 of FIG. 7 in which 404 and 406 are now bidirectional representing the additional possible transitions to account for the shift right alignment range of 402.

A cost may be assigned to each edge in the graph 410 as described elsewhere herein in connection with determining similarity measurements with FIG. 5. In addition to assigning costs to the edges, an embodiment may also assign a cost to each node. The cost associated with a node may represent the likelihood of including that node in the selected path. The cost associated with a node representing a first column of pixels may be based on a similarity measurement between the first column of pixels and other columns from other images that may overlap with the first column. The cost of the node may be the minimum of the foregoing comparisons. The foregoing is based on the premise that the greater the similarity between content from a first image and other content in other images, the greater the likelihood that the content is not an occlusion, inaccuracy, or artifact. As an example, consider 3 images of a building taken from three different perspectives or points of view. A person or tree may appear in front of the building in each image. The location of the person or tree with respect to the building changes depending on the perspective or viewpoint from which the image is obtained. The foregoing apparent change in position of the person or tree is due to parallax. When determining the texture for the building or generally producing a resulting image including the building, it may be desirable to not include the person or tree and treat the person or tree as an image occlusion. In contrast, content which consistently appears similar from image to image on a surface of the building (e.g., a window or door) may not be treated as an occlusion. With respect to node costs, the added cost computed for a node is greater for those nodes associated with content which does not appear consistently similar in the input images than for those nodes associated with content which does appear consistently similar in the input images.

In connection with computing the cost for a node, a similarity measurement may be determined using SSD or other function as described herein for use when determining edge costs. The function used in connection with determining costs of nodes may be the same or different from the function used to determine edge costs.

To illustrate, reference is made to FIG. 6 where the alignment of images 306 and 308 is known (e.g., no alignment range as illustrated in connection with FIGS. 7 and 8). C overlaps D and C1 overlaps E. In this case, the cost of node C is the same as the cost of node D which is the similarity measurement between C and D. If C and D are not similar, for example, because of an occlusion in one of the images 306 and 308, then C will have a higher cost than if there is no such occlusion. Similarly, the cost of C1 is the same as the cost of E which the similarity measurement between C1 and E.

To further illustrate, reference is made to FIGS. 7 and 8 where the alignment of images 306 and 308 is not exactly known but rather specified in accordance with an alignment range. In this case, node C may overlap with D (e.g., 302), and E (e.g., 362). The cost for node C may be represented as:

cost C=min (similarity (C,D), similarity (C,E)), where "similarity" determines the similarity measurement for the two nodes indicated in the parenthesis, (e.g., similarity (C,D) is the similarity measurement with respect to image portions corresponding to nodes C and D), and "min" is the minimum of the similarity values listed. Other statistical inference functions may be used besides the forgoing to deduce a plausibility measure per node. With reference to FIGS. 7 and 8, the cost for each node associated with a column of pixels which may overlap one or more columns of pixels from another image may be represented as:

cost B=similarity (B,D)
cost C1=min (similarity(C1,E), similarity(C1,F), similarity (C1,D))
cost D=min (similarity(D,C), similarity(D,B), similarity(D, C1))
cost E=min (similarity(E,C1), similarity(E,C))
cost F=similarity (F,C1)

Those nodes associated with columns which do not overlap another column from a different image (e.g., node A) may be assigned a default cost value of 0.

After the edge costs and nodes costs are computed, any one of a variety of different techniques may be used to find the shortest or least costly path in the graph. For example, an embodiment may use dynamic programming or Dijkstra's technique for finding the shortest or least costly path from a starting node, corresponding to the first possible column of pixels in the graph, to the end node, corresponding to the last possible column of pixels in the graph. Dijkstra's technique is described in more detail below. Dynamic programming is a technique or class of solution methods for solving a problem exhibiting a particular property in that subproblems have optimal solutions that can be used to then find optimal solutions of the overall problem. A classic example of a problem which may be solved using dynamic programming techniques is the shortest path problem. Using dynamic programming techniques, the problem may be broken down into smaller subproblems and optimal solutions determined for the subproblems. Subsequently, these optimal subproblem solutions may be used to construct an optimal solution for the original problem. Recursive programming techniques may be used to compute such solutions.

Prior to finding the shortest or least costly path, an additional starting node and ending node may be added to the graph. The new starting node may be connected to each of the one or more nodes representing pixels that may be the first column in the resulting image. With reference to the example graphs (e.g., FIGS. 5, 6, 7, and 8) described above, there is only one possible starting node since there is no overlap area associated with the first column of pixels. For example, with reference to FIG. 5, the starting node may be connected to A1. In the case where there is an overlap area associated with the first column of pixels (e.g., two or more possible candidates for the first column of pixels in the resulting image), the new starting node may be connected to each of the nodes representing pixels that may be the first column in the resulting image. The cost associated with the starting node may be zero and the cost associated with each such added edge from the starting node may also be zero although other costs may be used in an embodiment and associated with both the starting node and/or each such added node. Similarly, an ending node may be added to the graph and connected to all nodes representing pixels that may be the last column in the resulting image. For example with reference to element 362 and 364 of FIG. 7, either C1 or F may occupy the last column of pixels in the resulting image. In this case, an ending node may be added and connected to each of the nodes C1 and F. The ending node has a cost of zero and the cost associated with the added edges from each of C1 and F to the ending node has a cost of zero.

Figure 9:
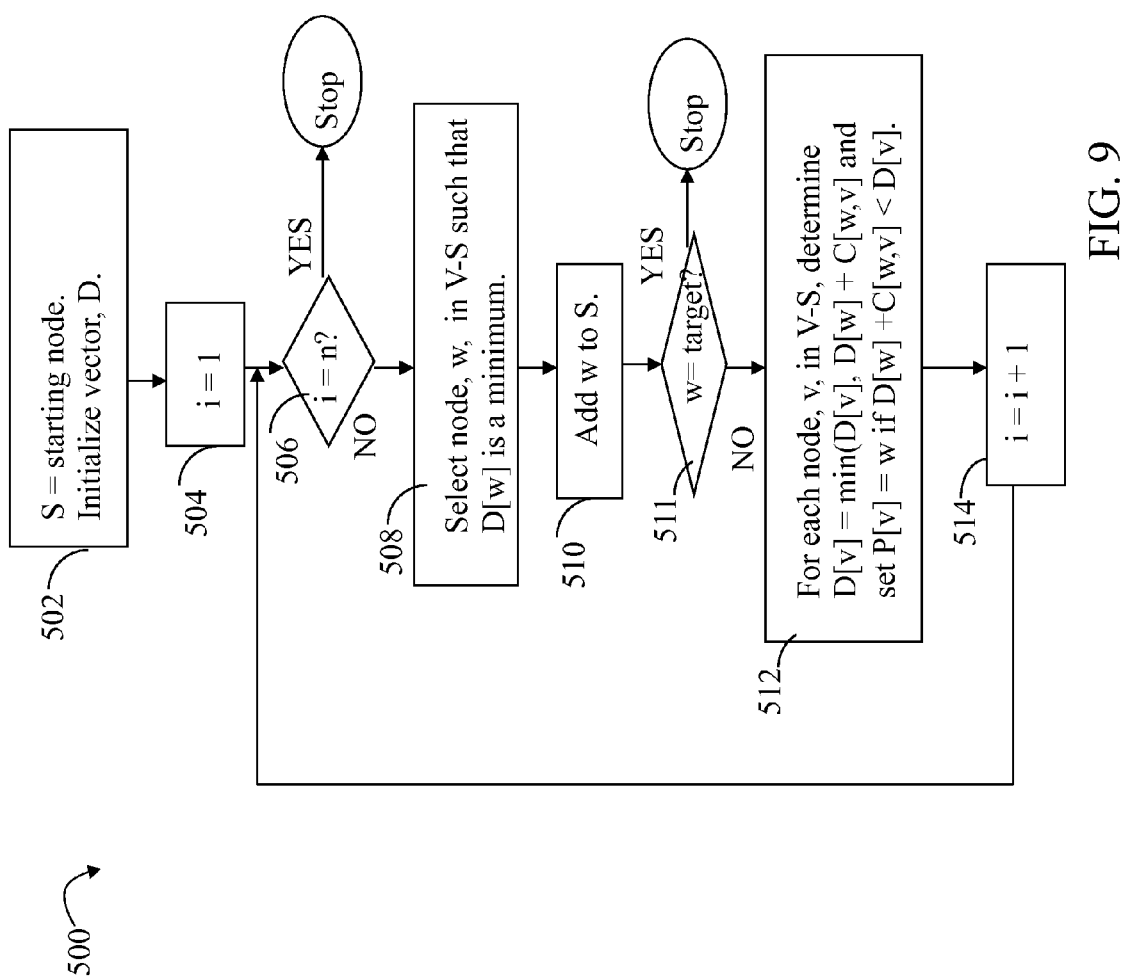
FIG. 9 is a flowchart of processing steps that may be used in an embodiment connection with finding the shortest or least costly path in a graph generated using the techniques herein.

Referring to FIG. 9, shown are steps that may be performed in an embodiment for determining the shortest or least costly path in the graph using a version of Dijkstra's shortest path algorithm. The flowchart 500 of FIG. 9 utilizes Dijkstra's shortest path algorithm with using node costs as well as edge costs when computing the cost of a path. In connection with the flowchart 500, an input is the graph for which we are determining the shortest path. V represents a set of all vertices or nodes in the graph. The steps of 500 maintain a set of nodes S whose shortest distance from the source is already known. Initially, S includes only the starting node. At each execution of step 510 (as will be described below), a node w is added to S whose distance from the source is as short as possible. Assuming all edges and nodes have non-negative costs, the shortest path from the source to node w that passes through only the nodes included in S may be determined and referred to as a "special" path. At each execution of step 512, the array D records the total cost of the shortest path to each node. Once S includes all nodes, all paths are "special" so D will hold the shortest distance (e.g., least cost path) from the source or starting node to each node. During execution of the steps of 500, the array D includes, for each node v, the cost D[v] of the shortest path found so far between the starting node and v.

In connection with the representation of the algorithm in the flowchart 500, the set of vertices or nodes in the graph, V, is represented as V={1, 2, ..., n} and vertex 1 is the source or starting node. C is a 2 dimensional array of costs where C[i,j] is the cost of the edge from i to j and the cost associated with node j. If there is no edge from i to j, then the cost C[i,j]=∞, or some other value much larger than any actual cost. After each execution of step 512, D[i] contains the length of the current shortest "special" path (e.g., formed using nodes only in S) from the source or starting node to the node i. Initially, D is 0 for the source and for all values of i≠source, and D[i]=C[i,j].

The steps of flowchart 500 are generally written to determine the shortest path from the source to each node in the graph. In connection with the techniques herein, there is only interest in determining the shortest path from the source to a specific target node so processing may terminate once the target node, the ending node, has been selected in step 508 (e.g., terminate processing via test at step 511). In connection with the techniques herein, target may be set to the ending node.

Since we will want to construct the shortest path, another array, P, may be maintained. P may be characterized as the predecessor array of nodes. P[v] contains the predecessor of a node v which is updated in step 512 if, for a node w selected in step 508, D[w]+C[w,v]<D[v]. Upon termination with step 511 evaluating to yes, the shortest path from starting node to ending node may be found by tracing the predecessors in reverse order beginning at the ending node.

The processing of flowchart 500 begin at step 502 where S is initialized to include the starting node. For purposes of illustration, the starting node may be denoted by the vertex 1. The vector D is also initialized as described above. At step 504, a loop counter i is assigned a value of 1. At step 506, a determination is made as to whether i=n, where n is the number of nodes in the graph. If so processing stops. It should be noted that step 506 may evaluate to yes if processing is not terminated earlier in connection with step 511. If step 506 evaluates to no, control proceeds to step 508 to select a node w from the set of nodes V-S having the minimum D value. At step 510, w is added to the set S. At step 511, a determination is made as to whether the selected node w is the target or ending node. If so, processing stops. Other control proceeds to step 512. At step 512, for each node, v, in V-S, D[v]=min (D[v], D[w]+C [w,v]). Also as part of step 512, P[v]=w if D[w]+C [w,v]<D[v]. From step 512, control proceeds to step 514 where i is incremented and processing continues with step 506.

Figure 10:
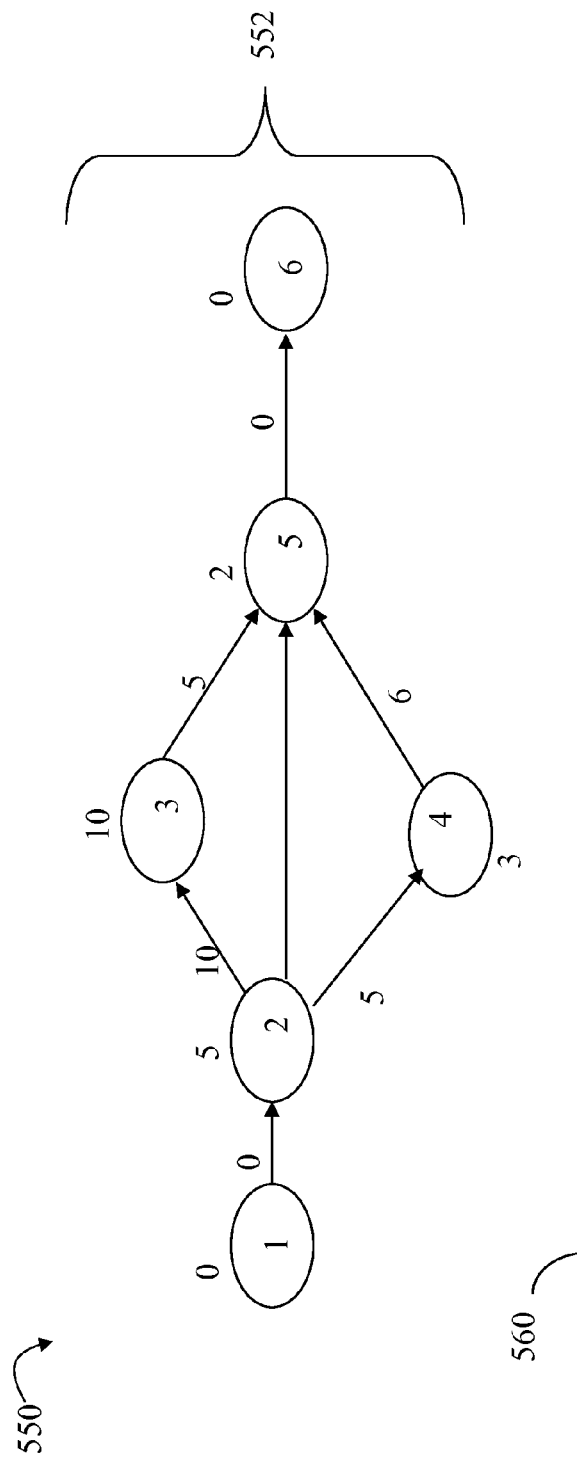
FIG. 10 illustrates an example of the shortest path determination using the steps of FIG. 9.

To illustrate the use of the steps of FIG. 9 in connection with determining the shortest path, an example is illustrated in FIG. 10. Graph 552 may represent a graph of the transitions as described herein in which the shortest path from the starting node 1 to the target or ending node 6 represents the columns of pixels selected in constructed a resulting image as described above. Associated with each node and edge may be a cost determined as also described above. The costs in 552 are exemplary for purposes of illustrating the shortest path technique applied to the graph. The table 560 represents values for the different items indicated in the first row for each iteration of the loop formed by steps 506, 508, 510, 511, 512, and 514. On the third iteration, processing is terminated at step 511 since the node w selected at step 508 is the ending node 6. In connection with determining the shortest path from starting node 1 to ending node 6, the predecessor vertices in the array P may be traced backwards. For example, to find the shortest path from 1 to 6, the predecessors are traced in reverse order beginning with node 6. Using P, it is determined that the predecessor of node 6, P[6], =5. The value or content (e.g., 5) of the array element P[6] is then used as an index value for the next predecessor or P array element examined, P[5]. Using P, it is determined that P[5]=2. The value or content (e.g., 2) of the array element P[5] is then used as an index value for the next P array element examiner P[2]. Using P, it is determined that P[2]=1. At this point the shortest path has been traced backward since 1 is our starting node. Thus, the shortest path from node 1 to node 6 is 1, 2, 5, 6 for the example 550.

Figure 11:
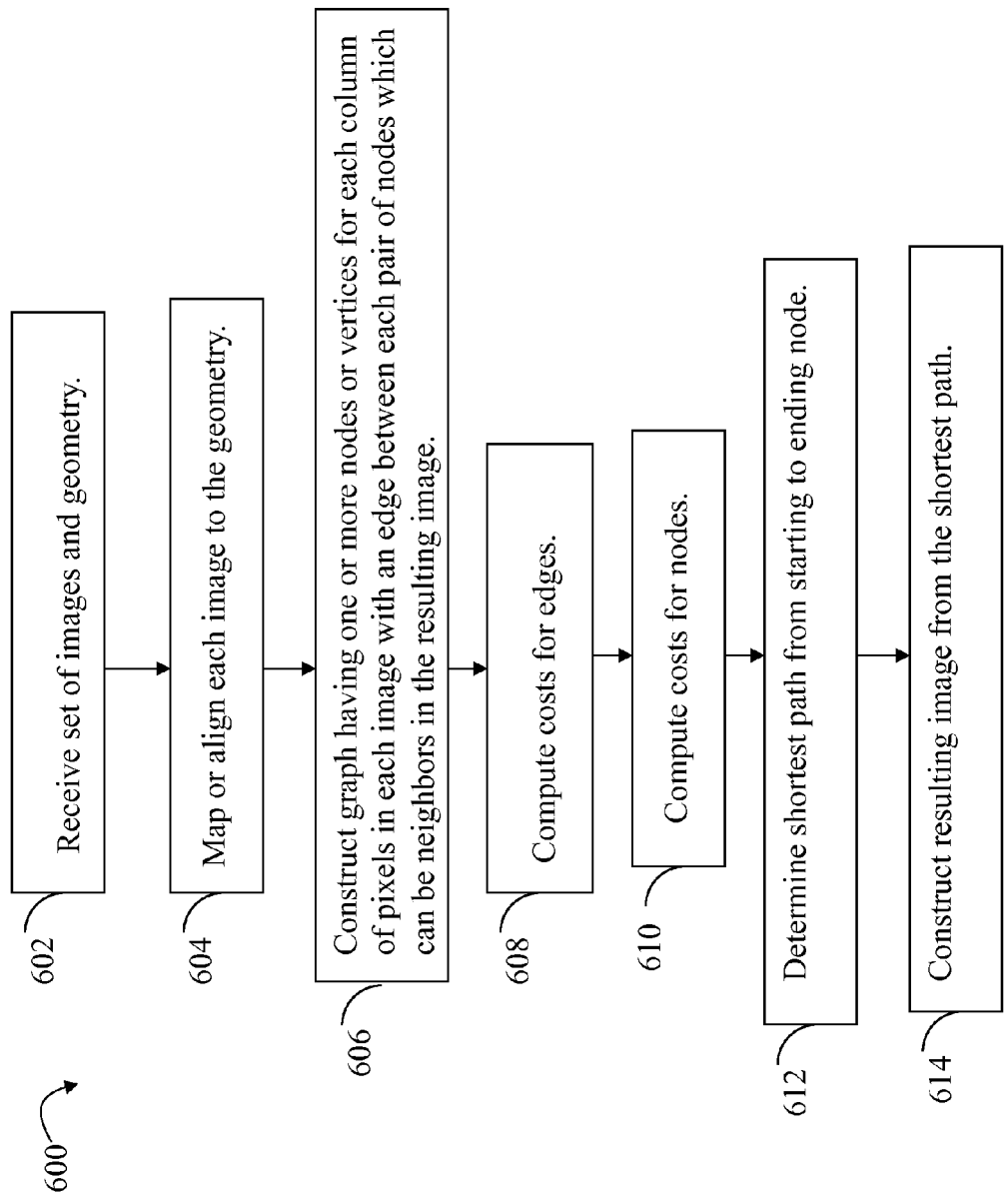
FIG. 11 is a flowchart of processing steps that may be performed in an embodiment utilizing the techniques herein.

Referring to FIG. 11, shown is a flowchart 600 of processing steps that may be performed in an embodiment using the techniques as described herein. At step 602, a set of images and a geometry are received. The images may be overlapping input images, such as 202, 204 and 206 of FIG. 3. The geometry may approximate the shape of the object included in the images for which a texture is generated. The texture may be included in the resulting image formed by combining the input images. At step 604, each image is mapped or aligned to the geometry, such as also illustrated in FIG. 3. At step 606, a graph may be constructed having one or more nodes or vertices for each column of pixels in each of the images. An edge may exist between nodes to represent a transition between the nodes if the vertical strips or columns of pixels associated with the first node and the second node can be neighbors in the resulting image. As discussed above, processing may be performed using the techniques herein to handle left-right misalignment. It should be noted that processing may be performed to also handle up-down misalignment. For example, this may be done by having more than one node for each column of pixels, each node representing a different up/down shift.

At step 608, costs may be computed for the edges. At step 610, costs may be computed for the nodes. Techniques for determining costs of edges and nodes are described above. At step 612, the shortest or least costly path from the staring node to the ending node in the graph is determined. This path represents the ordering of columns of pixels in the resulting image formed by combining the input images from step 602. At step 614, the resulting image is constructed from the shortest path determined in step 612. The resulting image includes neighboring vertical strips which have been scored. The greater the similarity between a combination of neighboring vertical strips and content in the input images, the lower the cost associated with the edge representing the associated transition. The greater the similarity, the more desirable the combination, and the lower the cost. In this example, each node represents a column of pixels in one of the images. The edges represent the possible transitions and transition costs of placing the columns of pixels next to one another in the resulting image. Each possible path in the graph from the starting node to the ending node is a possible solution of how to concatenate portions of the input images to produce the resulting image. In other words, each path in the graph represents a possible placement or ordering of portions of the multiple images in the resulting image. The selected path is the shortest or least costly path in the graph having the least amount of artifacts.

In connection with the techniques herein, the costs associated with the edges denoting similarity measurements with respect to portions of the input images may be used to generate plausible or realistic textures from a resulting image that is a combination of the input images. The input images may be mapped with respect to a geometry approximating an object for which a texture is generated from the resulting image. Additionally, a cost may be determined for a node representing a portion of an image which overlaps one or more other portions of other images. The cost associated with a node may denote a similarity measurement between a first image portion, such as a pixel column, associated with the node, and other image portions that may overlap with the first image portion. The cost associated with a node may be used in connection with generating a plausible or realistic texture as well as more generally in connection with combining input images in connection with other applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for combining a plurality of visual images that comprise views of a physical object to generate a resulting visual image of the physical object, the computer-implemented method comprising the steps of:

receiving, at a computing device implementing the computer-implemented method, the plurality of images, each of the plurality of images comprising computer-readable data defining individual pixels of the each of the plurality of images;

determining, by the computing device, which portions of pixels from different ones of the plurality of images overlap one another;

aligning, by the computing device, the plurality of images with one another such that the portions of pixels from different ones of the plurality of images, which were determined to overlap one another, overlap one another;

generating, at the computing device, computer-readable data representing a plurality of nodes, with each node in the plurality of nodes corresponding to a slice of pixels in one of the plurality of images;

generating, at the computing device, computer-readable data representing edges between the plurality of nodes, each edge connecting two nodes whose corresponding slices of pixels can be neighboring slices in the resulting image based on the aligning;

generating, at the computing device, computer-readable data representing a graph comprising the plurality of nodes and the generated edges such that each possible way of forming the resulting image is represented by paths from a starting node to an ending node, of the constructed graph, along the edges;

computing, by the computing device, costs for at least some of the edges based on a similarity measurement of a combination of the slices of pixels corresponding to the two nodes connected by an edge with respect to content of the plurality of images;

computing, by the computing device, costs for at least some of the plurality of nodes based on how similar a node's corresponding slice of pixels is to overlapping slices of pixels from other images, from the plurality of images;

determining, by the computing device, a path from the starting node to the ending node in the graph having a smallest total cost, the path representing an ordering of slices of pixels from the plurality of images; and constructing, at the computing device, the resulting visual image of the physical object from the ordering of slices of pixels from the plurality of images in accordance with the determined path having the smallest total cost.

2. The method of claim 1, wherein the costs of at least one of the edges or the nodes are determined using a sum of squared differences.

3. The method of claim 1, wherein aligning of at least two of the plurality of images is performed with respect to an alignment range defining a range of pixels and identifying multiple alignment possibilities between the at least two images.

4. The method of claim 1, wherein each of the slices of pixels comprises only one pixel along one of its dimensions.

5. The method of claim 1, wherein each edge has an associated cost that is a function of one or more values.

6. The method of claim 1, wherein the slices of pixels are vertical slices of pixels forming columns of pixels.

7. The method of claim 1, wherein the slices of pixels are horizontal slices of pixels forming rows of pixels.

8. A computer-readable storage medium not consisting of a signal, the computer-readable storage medium comprising computer-executable instructions stored thereon for combining a plurality of images to generate a resulting image, the computer-executable instructions performing steps comprising:

receiving the plurality of images, each of the plurality of images comprising computer-readable data defining individual pixels of the each of the plurality of images;

determining which portions of pixels from different ones of the plurality of images overlap one another;

aligning the plurality of images with one another such that the portions of pixels from different ones of the plurality of images, which were determined to overlap one another, overlap one another;

generating a plurality of nodes, with each node in the plurality of nodes corresponding to a slice of pixels in one of the plurality of images;

generating edges between the plurality of nodes, each edge connecting two nodes whose corresponding slices of pixels can be neighboring slices in the resulting image based on the aligning;

generating a graph comprising the plurality of nodes and the generated edges such that each possible way of forming the resulting image is represented by paths from a starting node to an ending node, of the constructed graph, along the edges;

computing costs for at least some of the edges based on a similarity measurement of a combination of the slices of pixels corresponding to the two nodes connected by an edge with respect to content of the plurality of images;

computing costs for at least some of the plurality of nodes based on how similar a node's corresponding slice of pixels is to overlapping slices of pixels from other images, from the plurality of images;

determining a path from the starting node to the ending node in the graph having a smallest total cost, the path representing an ordering of slices of pixels from the plurality of images; and constructing the resulting image from the ordering of slices of pixels from the plurality of images in accordance with the determined path having the smallest total cost.

9. The computer-readable storage medium of claim 8, wherein the costs of at least one of the edges or the nodes are determined using a sum of squared differences.

10. The computer-readable storage medium of claim 8, wherein aligning of at least two of the plurality of images is performed with respect to an alignment range defining a range of pixels and identifying multiple alignment possibilities between the at least two images.

11. The computer-readable storage medium of claim 8, wherein each of the slices of pixels comprises only one pixel along one of its dimensions.

12. The computer-readable storage medium of claim 8, wherein each edge has an associated cost that is a function of one or more values.

13. The computer-readable storage medium of claim 8, wherein the slices of pixels are vertical slices of pixels forming columns of pixels.

14. The computer-readable storage medium of claim 8, wherein the slices of pixels are horizontal slices of pixels forming rows of pixels.

15. A computing device comprising:

a computer-readable storage medium comprising computer-executable instructions for performing steps comprising:

receiving a plurality of images, each of the plurality of images comprising computer-readable data defining individual pixels of the each of the plurality of images;

determining which portions of pixels from different ones of the plurality of images overlap one another;

aligning the plurality of images with one another such that the portions of pixels from different ones of the plurality of images, which were determined to overlap one another, overlap one another;

generating a plurality of nodes, with each node in the plurality of nodes corresponding to a slice of pixels in one of the plurality of images;

generating edges between the plurality of nodes, each edge connecting two nodes whose corresponding slices of pixels can be neighboring slices in the resulting image based on the aligning;

generating a graph comprising the plurality of nodes and the generated edges such that each possible way of forming the resulting image is represented by paths from a starting node to an ending node, of the constructed graph, along the edges;

computing costs for at least some of the edges based on a similarity measurement of a combination of the slices of pixels corresponding to the two nodes connected by an edge with respect to content of the plurality of images;

computing costs for at least some of the plurality of nodes based on how similar a node's corresponding slice of pixels is to overlapping slices of pixels from other images, from the plurality of images;

determining a path from the starting node to the ending node in the graph having a smallest total cost, the path representing an ordering of slices of pixels from the plurality of images; and constructing the resulting image from the ordering of slices of pixels from the plurality of images in accordance with the determined path having the smallest total cost;

a processing unit executing the computer-executable instructions; and a display displaying a rendered image of a three-dimensional physical object having the resulting image mapped to a surface of a geometry representing the three-dimensional physical object.

16. The computing device of claim 15, wherein the costs of at least one of the edges or the nodes are determined using a sum of squared differences.

17. The computing device of claim 15, wherein aligning of at least two of the plurality of images is performed with respect to an alignment range defining a range of pixels and identifying multiple alignment possibilities between the at least two images.

18. The computing device of claim 15, wherein each edge has an associated cost that is a function of one or more values.

19. The computing device of claim 15, wherein the slices of pixels are vertical slices of pixels forming columns of pixels.

20. The computing device of claim 15, wherein the slices of pixels are horizontal slices of pixels forming rows of pixels.

* * * * *